Jan. 6, 1953 W. F. ALLER 2,624,196
PNEUMATIC GAUGING DEVICE
Filed April 28, 1948

INVENTOR.
W. F. Aller
BY Edward T. Noif

Patented Jan. 6, 1953

2,624,196

UNITED STATES PATENT OFFICE 2,624,196

PNEUMATIC GAUGING DEVICE

Willis Fay Aller, Dayton, Ohio, assignor to The Sheffield Corporation, Dayton, Ohio, a corporation of Ohio Application April 28, 1948, Serial No. 23,729

4 Claims. (Cl. 73—37.5)

This invention relates to gauging apparatus for measuring or comparing size differentials in workpiece surfaces.

One object of the invention is the provision of a gauging apparatus for determining the size differential of a plurality of workpiece surfaces and arranged so an indication is produced if such size differential is not within certain predetermined tolerance limits.

Another object of the invention is the provision of a gauging apparatus for gauging or comparing the diameters of a part at different points on the part and employing air pressure responsive elements to indicate whether or not the diameter differential is within a predetermined tolerance limit.

Another object is the provision of a gauging apparatus of the character mentioned employing a plurality of fluid pressure responsive elements connected to a pair of spaced fluid gauging orifices cooperating with the work at different points along the length of the work.

Other objects and advantages of the invention will be apparent from the following description, the appended claims and the accompanying drawing, in which, Fig. 1 is a central vertical section of a gauging apparatus embodying the present invention;

Figure 3:
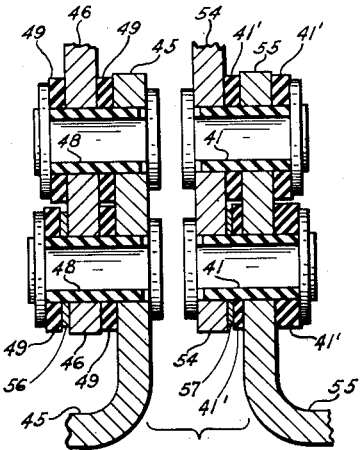
Fig. 3 is a section on the line 3—3 of Fig. 2, on an enlarged scale.
Figure 2:
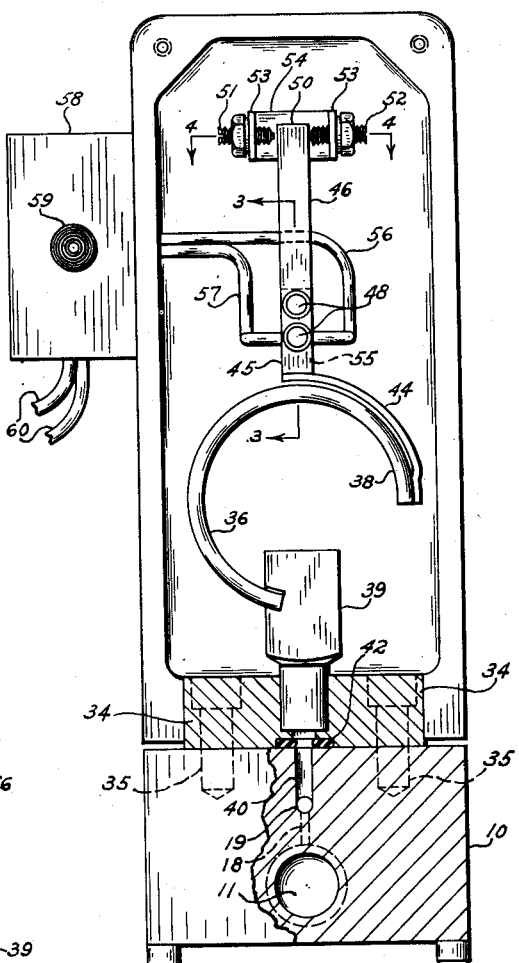
Fig. 2 is a front elevation of the gauging apparatus, with the front cover plate removed and a portion of the base shown in section along the line 2—2 of Fig. 1.
Figures 1, 5:
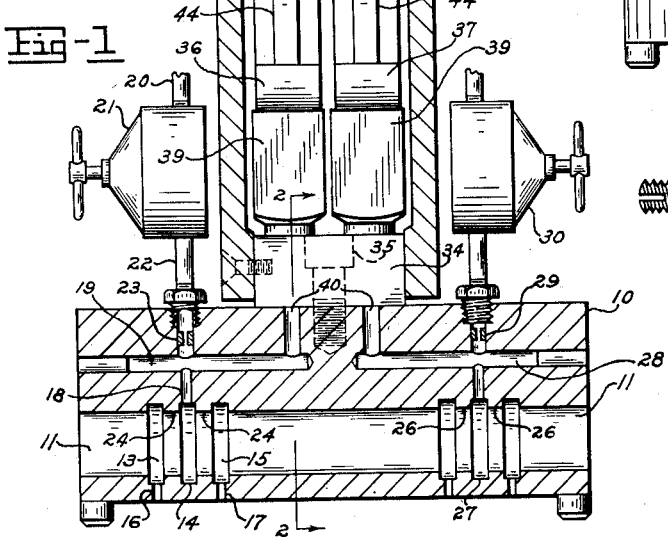
Fig. 5 is a vertical section of a modified form of work holder, on a reduced scale.
Figure 4:
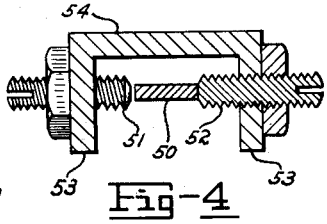
Fig. 4 is a horizontal section on the line 4—4 of Fig. 2, also on an enlarged scale.

Referring more particularly to the drawing, in which the same reference numerals have been used to designate like parts in the several views, the gauging apparatus as shown in Figs. 1 and 2 incorporate a work receiving base 10, the invention as herein illustrated in Figs. 1 to 4 being adapted for the measurement of taper of an elongated annular workpiece. The base 10 has a passage 11 through which the workpiece may be passed, the diameter of the passage 11 being very slightly larger than the diameter of the workpieces to be gauged where the workpieces are substantially cylindrical. If the workpieces to be gauged have a substantial taper the passage 11 is of corresponding form.

Near one end of the passage 11, the base 10 is provided with three annular grooves 13, 14 and 15, grooves 13 and 15 communicating through passages 16 and 17 with the outside air. Groove 14 is connected by passage 18 to a pressure chamber 19 is supplied with air under pressure. This pressure air supply comprises a pipe 20 which may be connected to the factory air line, pipe 20 supplying an adjustable pressure regulating valve 21 which is connected by pipe 22 to the chamber 19, a restriction 23 being arranged between the pressure regulator and the chamber 19 so that the pressure existing in the chamber 19 will be in accordance with the flow taking place through the groove 14. At either side of the groove 14 is an annular gauging surface 24 which may be a few ten-thousandths of an inch larger in diameter than the passage 11. The air supplied to the groove 14 passes between the work surface and the gauging surface 24 and the amount of this air flow or leakage depends on the average diameter of the workpiece and controls the pressure existing in the chamber 19.

Adjacent the other end of the base 10 there is a similar arrangement of cylindrical gauging surfaces and passages, including the gauging surfaces 26, air supply groove 27, chamber 28, restriction 29, and adjustable pressure regulating valve 30.

A gauging head 32 including a casing 33 provided with a cover plate 31 and a mounting block 34 is secured to the upper flat side of the base 10 by attaching bolts 35. Expansible pressure responsive elements 36 and 37 are arranged side by side on the mounting block. Each of these elements comprises a curved expansible hollow tube 38, of the Bourdon tube type, extending from the hollow post 39 which is rigidly secured in a vertical bore in the mounting block. The post 39 places the interior of the tube 38 in communication with a vertical passage 40 in the base 10. A rubber sealing disc 42 makes a pressure tight connection between the mounting block 34 and the base 10. The two elements 36 and 37 thus communicate respectively with the two fluid pressure chambers 19 and 28.

Fixed to the movable end of the element 36 is an arm 44 having upwardly extending sections 45 and 46 which are insulated from one another by insulating bushings and washers 48 and 49. The section 46 extends upwardly and constitutes an electrical contact 50 interposed between two spaced contact screws 51 and 52 threaded in the ears 53 of an arm section 54 secured to arm section 55 by means of insulating bushings and washers 41 and 41'. Section 55 is secured to the free end of the element 37. A wire 56 is electrically connected at one end to the upper section 46 of one of the arms and a second wire 57 is electrically connected to the upper section 54 of the other arm, and thus is electrically connected to both screws 51 and 52. These two wires 56 and 57 extend respectively to a suitable source of current and an electric lamp contained in a lamp housing 58 in back of a cover glass 59. Lead wires 60 extend to the supply source, one of these wires constituting an extension of the wire 56 while the other wire 60 is connected to the lamp. The arrangement is such that a circuit through the lamp is completed when the contact arm 50 touches either one of the two screws 51 or 52, there being a space between both of these screws and the contact arm 50 when the parts are in their normal relationship.

The apparatus is set up by applying a master of known size and taper to the passage 11. In a case where the taper is zero, which is the particular application herein illustrated, the master is applied and the two pressure regulating valves adjusted to bring the arm 50 midway between the ears 53. A second master may then be applied, having a slight taper not in excess of the permissible taper of the workpiece to be checked. The adjusting screws 51 and 52 are then adjusted so that arm 50 is just ready to touch one of these screws. With the tapered workpiece then reversed in the work holder, the other screw is set so it is just clear of the contact arm 50. The gauge is then ready for use and the workpiece to be gauged is applied to the work holder. Air is supplied through the two pressure regulating valves to the pressure chambers 19 and 28 and then to the two grooves 14 and 27 respectively. The air then leaks along the surfaces 24 and 26 and the amount of these leakage flows determines the pressures existing in the pressure chambers 19 and 28 respectively. If the leakage is the same at both the gauging locations, the pressure applied to the tubes 36 and 37 will be the same and both of the contact carrying arms secured to those tubes will maintain their relative positions with respect to one another although they both may move a similar amount if the actual diameter of the workpiece is smaller or larger than the diameter of the master. If the taper in the workpiece is greater than a predetermined permissible amount, as determined by the setting of the contact screws 51 and 52, then one of the arms will move with respect to the other and a circuit will be completed by the arm 50 touching one or other of the two screws 51 and 52, thus energizing the lamp which will be visible through the glass 59 and indicate to the operator that the part is out of tolerance insofar as the relative size of the different dimensions gauged is concerned.

The use of two independent pressure regulating valves 21 and 30 permits the two fluid pressure responsive tubes to be initially set so that the arm 50 is midway between the ears on the other arm when a piece of the required taper is applied to the work holder even though the distance between the work and the gauging surfaces at the gauging stations may be different, with different leakages taking place at those different stations. The apparatus can be readily adjusted for the permissible tolerance simply by movement of the contacting screws.

The gauge head is arranged for convenient mounting on any one of a plurality of different work holders having passages of different sizes according to the diameters of the workpieces and in accordance with the taper to be checked. If there is a positive taper required, then of course the diameter of the gauging surfaces 24 is made correspondingly larger or smaller than the diameter of the gauging surfaces 26, and the passage 11 instead of being cylindrical would be a tapered passage corresponding to the proper taper of the workpiece. In such case, of course, the workpiece cannot pass entirely through the passage 11 as is the case with cylindrical workpieces.

The invention is not limited to the gauging of tapers. Instead of employing the work holding base 10, the latter may be substituted by a work holding base 65, shown in Fig. 5, in which a fluid pressure chamber 61 corresponding to the fluid pressure chamber 28 of Fig. 1 is in communication with two diametrically opposed gauging nozzles 62, while a second pair of horizontally spaced diametrically opposed gauging nozzles 63 are connected to the other pressure chamber corresponding to the chamber 19 of Fig. 1. The nozzles 63 may be arranged in the same transverse plane or in a plane only slightly spaced from the transverse plane of the nozzles 62. In this way an out-of-round condition can be shown by gauging the differential in the true diameters along lines 90 degrees apart, and shown by the relative movement of the two pressure responsive tubes connected to the two sets of gauging nozzles.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. Apparatus for gauging the amount of taper of a part comprising a holder for the part to be gauged said holder having a pair of gauging orifices spaced apart in the direction of the part axis and cooperating with the part to determine the amount of leakage of fluid supplied to said orifices, means for supplying fluid under controlled pressure to said orifices, a pair of fluid pressure responsive elements respectively connected in communication with said orifices, means supporting said elements side by side, a contact carrying arm on each of said elements, a contact on one of said arms, a second contact adjustably mounted on the other of said arms and normally spaced from said first contact, the contacts being adapted for engagement with one another only when a predetermined differential exists in the pressure to which said elements are subjected.

2. Apparatus for gauging the amount of taper of a part comprising a holder for the part to be gauged said holder having a pair of gauging orifices spaced apart in the direction of the part axis and cooperating with the part to determine the amount of leakage of fluid supplied to said orifices, a pair of adjustable pressure regulating valves for supplying fluid under controlled pressure to said respective orifices, a pair of fluid pressure responsive elements respectively connected in communication with said orfices, means supporting said elements side by side, a contact carrying arm connected to each of said elements, a contact carried by one of said arms, a second contact adjustably mounted on the other of said arms, an indicating circuit connected to said contacts and adapted for energization when the contacts touch because of a predetermined differential in the pressure to which said elements are subjected.

3. Apparatus for gauging different workpiece dimensions with respect to one another comprising a work head adapted for engagement with different workpiece portions to be gauged, said work head having a pair of gauging orifices spaced apart for cooperation with the different workpiece portions to be gauged and determining the amount of leakage of fluid supplied to said orifices, means for supplying fluid under controlled pressure to said orifices, a pair of fluid pressure responsive elements respectively connected in communication with said orifices, each of said elements having a movable portion operable to different positions in accordance with the pressure applied to the elements, means supporting said elements side by side, a contact carrying arm on the movable portion of each of said elements and each operable by its respective portion in a predetermined path, a contact on one of said arms, a second contact adjustably mounted on the other of said arms and normally spaced from the first contact, the path of movement of said arms being such that the contacts are adapted for engagement with one another when a predetermined differential exists in the pressure to which the elements are subjected, and an indicating circuit connected to said contacts and energized when the contacts touch.

4. Apparatus for gauging different workpiece dimensions with respect to one another comprising a work head adapted for engagement with different workpiece portions to be gauged, said work head having a pair of gauging orifices spaced apart for cooperation with the different workpiece portions to be gauged and determining the amount of leakage of fluid supplied to said orifices, means for supplying fluid under controlled pressure to said orifices, a pair of fluid pressure responsive elements respectively connected in communication with said orifices, each of said elements having a movable portion operable to different positions in accordance with the pressure applied to the elements, means supporting said elements side by side, a contact carrying arm on the movable portion of each of said elements and each operable by its respective portion in a predetermined path, one of said arms having two spaced extensions in the path of movement of the other arm and normally spaced from the other arm, the paths of movement of said arms being parallel and such that said other arm is adapted for engagement with one or the other of said extensions when a predetermined differential exists in the pressure to which the elements are subjected, and an indicating circuit connected to said arms and energized when said other arm touches either one of said extensions.

WILLIS FAY ALLER.

REFERENCES CITED

The following references are of record in the file of this patent:

UNITED STATES PATENTS

| Number | Name | Date |
| --- | --- | --- |
| 1,445,389 | Clark | Feb. 13, 1923 |
| 1,779,355 | Bodenhamer | Oct. 21, 1930 |
| 2,019,066 | Balsiger | Oct. 29, 1935 |
| 2,346,406 | Wright | Apr. 11, 1944 |
| 2,415,034 | Parker | Jan. 28, 1947 |
| 2,417,148 | Wright | Mar. 11, 1947 |
| 2,448,653 | Aller | Sept. 7, 1948 |

FOREIGN PATENTS

| Number | Country | Date |
| --- | --- | --- |
| 551,956 | Great Britain | Mar. 17, 1943 |